United States Patent [19]
Gavasso et al.

[11] 4,333,426
[45] Jun. 8, 1982

[54] INTERNAL COMBUSTION ENGINE CONSTRUCTION

[75] Inventors: John M. Gavasso, Farmington Hills; Louis G. Bodnar, Westland; Walter E. Parker, Plymouth, all of Mich.

[73] Assignee: Ford Motor Company, Dearborn, Mich.

[21] Appl. No.: 109,721

[22] Filed: Jan. 4, 1980

[51] Int. Cl.³ ............................................. F02C 1/02
[52] U.S. Cl. .............................. 123/90.27; 123/90.37; 123/666
[58] Field of Search ................... 123/657, 664–666, 123/90.27, 90.39

[56] References Cited

U.S. PATENT DOCUMENTS

| | | | |
|---|---|---|---|
| 2,963,010 | 12/1960 | Payne | 123/90.39 |
| 3,094,977 | 6/1963 | Sampietro | 123/666 |
| 3,160,148 | 12/1964 | Giacosa et al. | 123/41.57 |
| 3,164,143 | 1/1965 | Dolza | 123/90.27 |
| 3,219,019 | 11/1965 | Palmer | 123/90.27 |
| 3,306,271 | 2/1967 | Turlay | 123/90.27 |
| 3,531,234 | 9/1970 | Ravenel | 123/59 R |
| 3,738,338 | 6/1973 | Wickman | 123/90.27 |

FOREIGN PATENT DOCUMENTS 1300578  8/1969  Fed. Rep. of Germany ... 123/90.27

*Primary Examiner*—Craig R. Feinberg
*Attorney, Agent, or Firm*—Robert E. McCollum; Clifford L. Sadler

[57] ABSTRACT

An engine constructed with a hemispherically shaped combustion chamber having inlet and exhaust valves flush mounted in the surface of the chamber with centerlines perpendicular to the chamber surface and intersecting the cylinder bore centerline at a common point; the valve train components for each valve all acting in a single plane and having centerlines that together converge towards a common point adjacent the cylinder bore centerline, the valve train planes of each pair of inlet and exhaust valves being canted with respect to each other and to the camshaft axis, a single overhead camshaft being centrally located between the inlet and exhaust valves.

1 Claim, 6 Drawing Figures

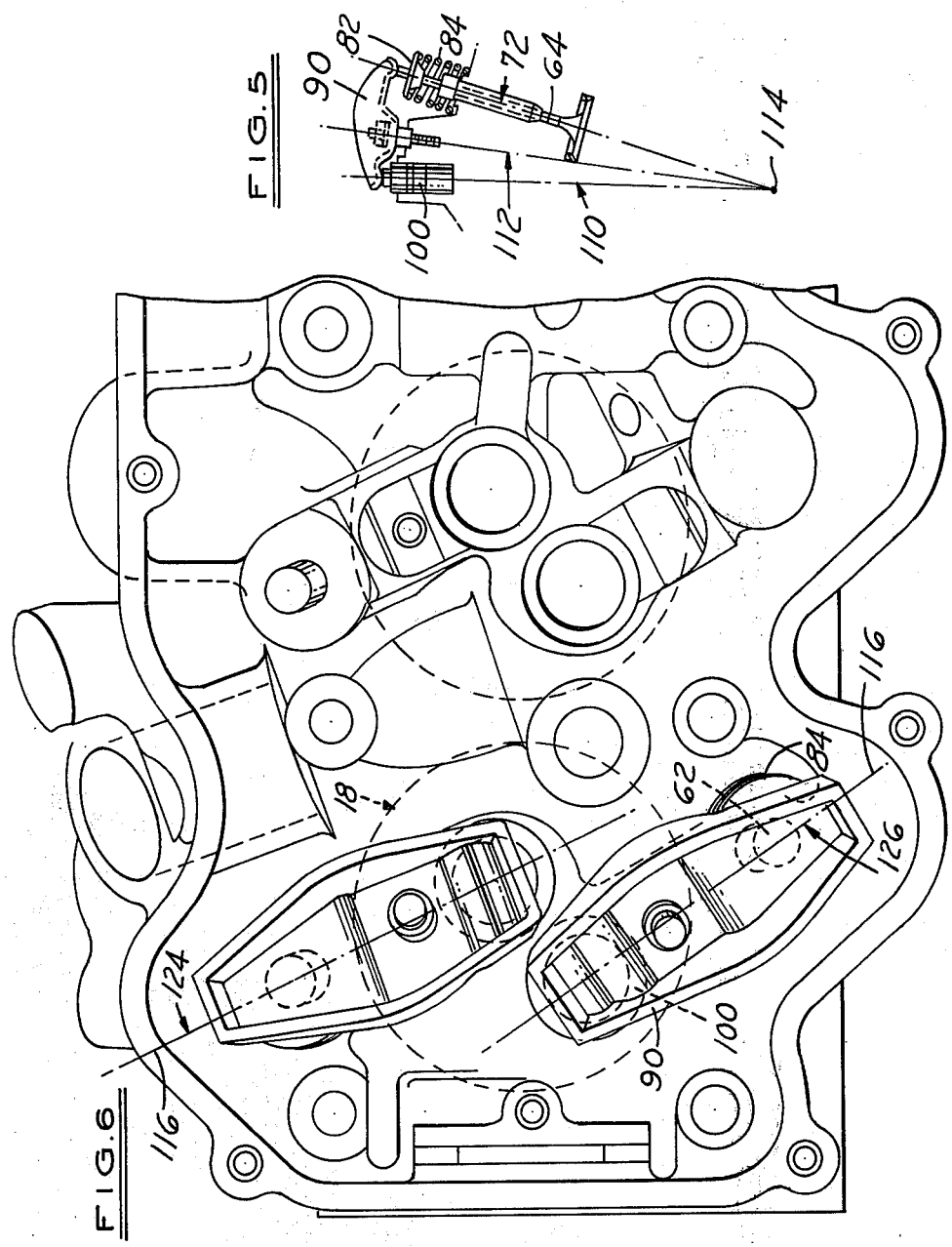

INTERNAL COMBUSTION ENGINE CONSTRUCTION

This invention relates in general to the construction of an internal combustion engine. More particularly, it relates to one that will minimize the output of unburned hydrocarbons.

It is common knowledge that the output of unburned hydrocarbons in an internal combustion engine increases in direct proportion to the increase in the surface/volume ratio of the combustion chamber. It is also common knowledge that a combustion chamber having a hemispherically shaped dome has a lower surface/volume ratio than a flat dome, bowl-in-piston type combustion chamber or a pancake shaped combustion chamber, for example, but not quite as low as a double hemispherically surfaced combustion chamber. The latter, however, generally results in an unsatisfactory compression ratio.

It is a primary object of this invention, therefore, to provide an internal combustion engine construction that includes a combustion chamber having a hemispherically domed surface with flush mounted intake and exhaust valves whose center lines are perpendicular to the hemispherical surface to constitute radii that meet in a common point on the center line of the cylinder bore, resulting in a low surface/volume ratio and, therefore, a lessening of emission of unburned hydrocarbons.

It is another object of the invention to provide an engine construction of the type described above that utilizes only a single overhead camshaft, with each valve having its own cam lobe and actuating a hydraulic tappet directly engaged with one end of a pivotally mounted rocker arm for moving a valve, the rocker arm being stud mounted to the cylinder head, and the centerlines of the tappet, rocker arm stud and valve together converging toward the cylinder bore centerline and all being contained in a single plane and meeting at a common point to eliminate sidewise thrust forces on the movable members.

It is a still further object of the invention to mount the plane of each valve train obliquely with respect to the rotational axis of the camshaft and canted from a vertical plane so that the centerline of each valve will be perpendicular to and intersect the hemispherical surface of the combustion chamber at a point that lies neither on the transverse nor longitudinal centerline of the cylinder bore to effect the flush mounting of the valve faces against the hemispherically shaped combustion chamber surface.

Another object of the invention is to cant the plane of each valve train so that each valve and port can be offset from the longitudinal and transverse centerlines of the cylinder bore, thus permitting large intake valves and an individual cam lobe for each valve, and a location of the spark plug close to the center of the combustion chamber for more efficient combustion.

Finally, it is an object of the invention to obtain a low emission output engine by providing an engine having a hemispherically domed combustion chamber with inlet and exhaust valves flush mounted in the hemispherical surface, thereby resulting in valve centerlines perpendicular to the surface and constituting radii of the surface meeting at a common point on the centerline of the cylinder bore; the centerlines of the intake and exhaust valve ports being offset laterally from the longitudinal and transverse axes of the cylinder bore for actuation by a centrally located single overhead camshaft with the intake valve overlapping the centerline of the bore to provide a large diameter intake valve providing greater engine power; and each valve train comprising a rocker arm having one end engaging a valve and the other end directly engaging a tappet, the tappet being engaged at its other end by a cam on the camshaft, the rocker arm being stud mounted to the cylinder head with means to prevent lateral rotation of the rocker arm about the stud axis; the rocker arm, valve and tappet all being movable in a single or common plane to eliminate side thrust forces, and each plane being obliquely located with respect to the camshaft rotational axis and angled or canted with respect to a plane perpendicular to the camshaft rotational axis to assure the flush mounting of the valves.

Other objects, features and advantages of the invention will become more apparent upon reference to the succeeding detailed description thereof, and to the drawings illustrating the preferred embodiment thereof, wherein:

FIG. 5 is a schematic representation of the plane of action of a single valve train for the engine of FIG. 1, and;

FIG. 6 is a partial top view, with the cover removed, of the engine shown in FIG. 1.

Figure 3:
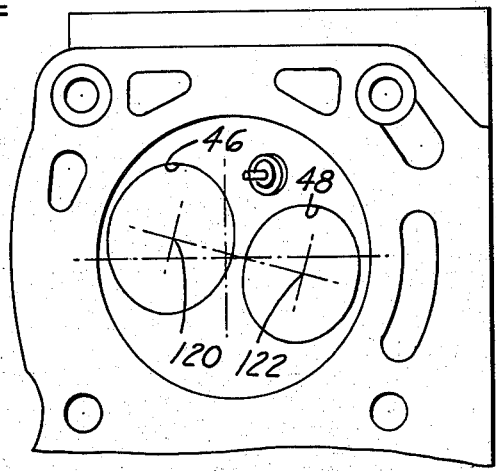
FIG. 3 is a bottom view of the combustion chamber of FIG. 2, looking up and taken on a plane indicated by and viewed in the direction of the arrows 3—3 of FIG. 2.
Figure 4:
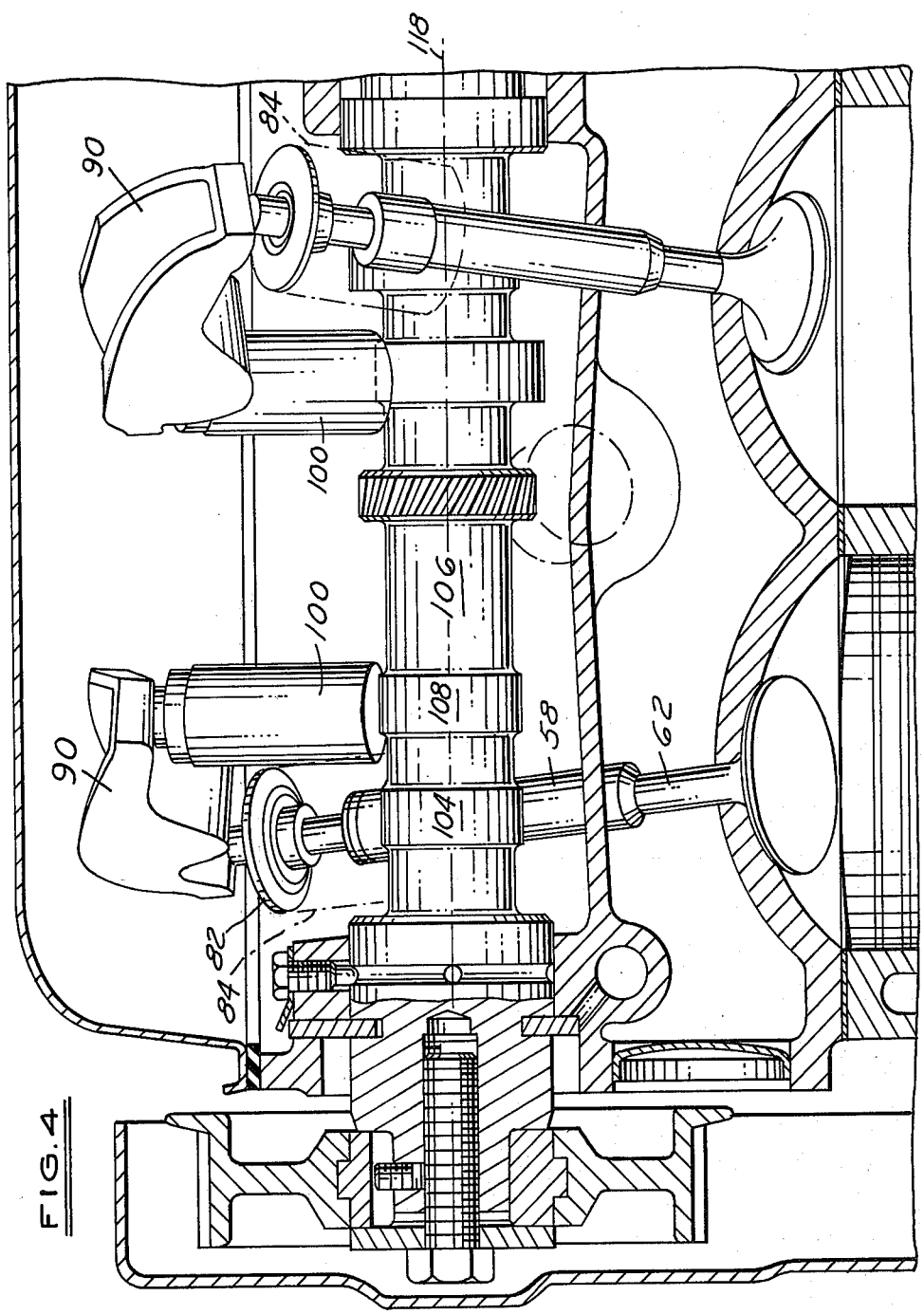
FIG. 4 is a partially schematic longitudinal side view, with parts broken away and in section, taken on a plane indicated by and viewed in the direction of the arrows 4—4 of FIG. 1.

Engine constructions are known in the prior art having some of the features called for above. For example, Dolza, U.S. Pat. No. 3,164,143, Internal Combustion Engine, shows in FIGS. 3–5 an engine that utilizes a single overhead camshaft and valve trains that are contained in single planes obliquely mounted with respect to the rotational axis of the camshaft. However, a penthouse type combustion chamber is used, and, as shown in FIG. 4, for example, the valve centerlines are canted so that the valves do not seat flush with the penthouse surface. That is, pockets are provided adjacent the edge of the valve in the dome of the penthouse that results in increased surface/volume ratio and a buildup of unburned hydrocarbons. This also decreases efficient breathing by providing air turbulence in the area of the pockets. While Dolza mentions the optional use of a spherical combustion chamber surface, there is no description of how the valves would be arranged to minimize the surface/volume ratio in the manner of this invention. Dolza does not describe a geometrical arrangement to provide a flush mounting of valves in a hemispherical surface with the valve axes perpendicular to the surface and intersecting at a common point on the bore axis.

Ravenel, U.S. Pat. No. 3,531,234, Camshaft Valve Gear For Engine Cylinder Head, shows in FIG. 3 an arrangement of valve train components all in a single plane that is obliquely located with respect to the camshaft rotational axis and to the cylinder bore axis. However, Ravenel does not have a hemispherically domed combustion chamber, which results in greater unburned hydrocarbon emissions. Also, the mounting of the rocker arms on shafts precludes the flush mounting of the valves in a hemispherical combustion chamber surface. Side pockets would result, providing an uneven air flow into the chamber and increased hydrocarbon deposits.

Palmer, U.S. Pat. No. 3,219,019, and Turlay, U.S. Pat. No. 3,306,271 both mention the use of hemispherical combustion chambers, and Turlay makes reference to a construction alleging eliminating the need for recessing the valve. However, neither shows or describes a construction that can provide the emission control of the invention. Both show inlet valves directly actuated by a camshaft cam rather than by a rocker arm; a camshaft that is not centrally located but one that is directly over the inlet valve; a camshaft axis that is perpendicular to the inlet valve axis, which, therefore, causes the axis of the inlet valve not to be in the same plane of rotation as the other valve train components; the inlet valves are not rocker arm actuated; the valves are not symetrically arranged on opposite sides of the camshaft; and the axis of the valve, rocker arm stud and tappet do not together converge towards the cylinder bore centerline to meet in a common point adjacent the centerline.

Other prior art of interest, but not showing or teaching the combination of the invention are Townsend, U.S. Pat. No. 1,443,856; Dolza, U.S. Pat. No. 3,046,961; Payne, U.S. Pat. No. 2,944,536; Giacosa, U.S. Pat. No. 3,160,148; Sampistro, U.S. Pat. No. 3,094,977; Payne, U.S. Pat. No. 2,963,010; and Celli, U.S. Pat. No. 2,973,548.

In contrast to the prior art referred to above, the engine construction shown in the attached drawings provides a combustion chamber having the truest hemispherical form, with flush mounted intake and exhaust valves that eliminate valve pockets or recesses. This results in a combustion chamber with a minimum surface area for a given compression volume, which reduces the output of unburned hydrocarbon emissions to a minimum.

The flush mounting of the valves is made possible by obliquely mounting the valve trains with respect to the rotational axis of the cam shaft and canting the valve trains from the vertical. The valve axis centerlines are thus perpendicular to the hemispherical chamber surface and intersect the bore centerline at a common point. This permits the use of a single, overhead cam shaft, which reduces complexity, the cam shaft in this case having separate cam lobes for each valve and side-by-side lifters movable without interference with one another.

The valve train components all operate in a single plane, which eliminates side thrust forces on the components. The valve train is rigid and low in inertia masses, which allows relatively high valve acceleration at high engine speeds to enhance good engine breathing and expansion of combustion gases. The cylinder head is of the cross flow type for maximum breathing efficiency, which results in more power, with the valves being placed opposite one another rather than adjacent so that the incoming charge has a direct flow across the combustion chamber and out the exhaust valve after combustion.

The canting and oblique mounting of the valve trains also permits locating the spark plug as near as possible to the chamber center without sacrificing valve size to provide sufficient rates of combustion for good fuel economy and optimum combustion efficiency. It also makes the plug more accessible for servicing from outside the rocker arm cover so that there is not interference with the design and/or complexity of the valve train cover.

The oblique mounting of the valve train allows the valve ports to be offset between head bolts for flexibility of port design, and also permits the use of the largest intake valve size by being able to locate the valve axes at a point other than on the transverse or longitudinal centerlines of the cylinder. It also permits designing the intake ports with or without swirl.

Other features of this engine are (1) forming the exhaust port square with the side of the cylinder head so that it can be formed with permanent mold casting equipment, thereby reducing cost; (2) using rocker arms, that ride directly on the tappets thereby eliminating any additional wear surfaces or means to provide slide; (3) using semi-cylindrical fulcrums to prevent the rocker arm from rotating off the valve stem tip, to eliminate the need for a guide around the valve stem tip and thereby reduce valve stem bore wear, and to impart stability and permit bolting directly to bosses cast directly in the cylinder head; (4) permitting the casting of the cylinder head in aluminum alloy to utilize the fullest advantage of permanent mold casting techniques; and (5) mounting of the cam shaft in the cylinder head to reduce overall engine height.

Figure 1:
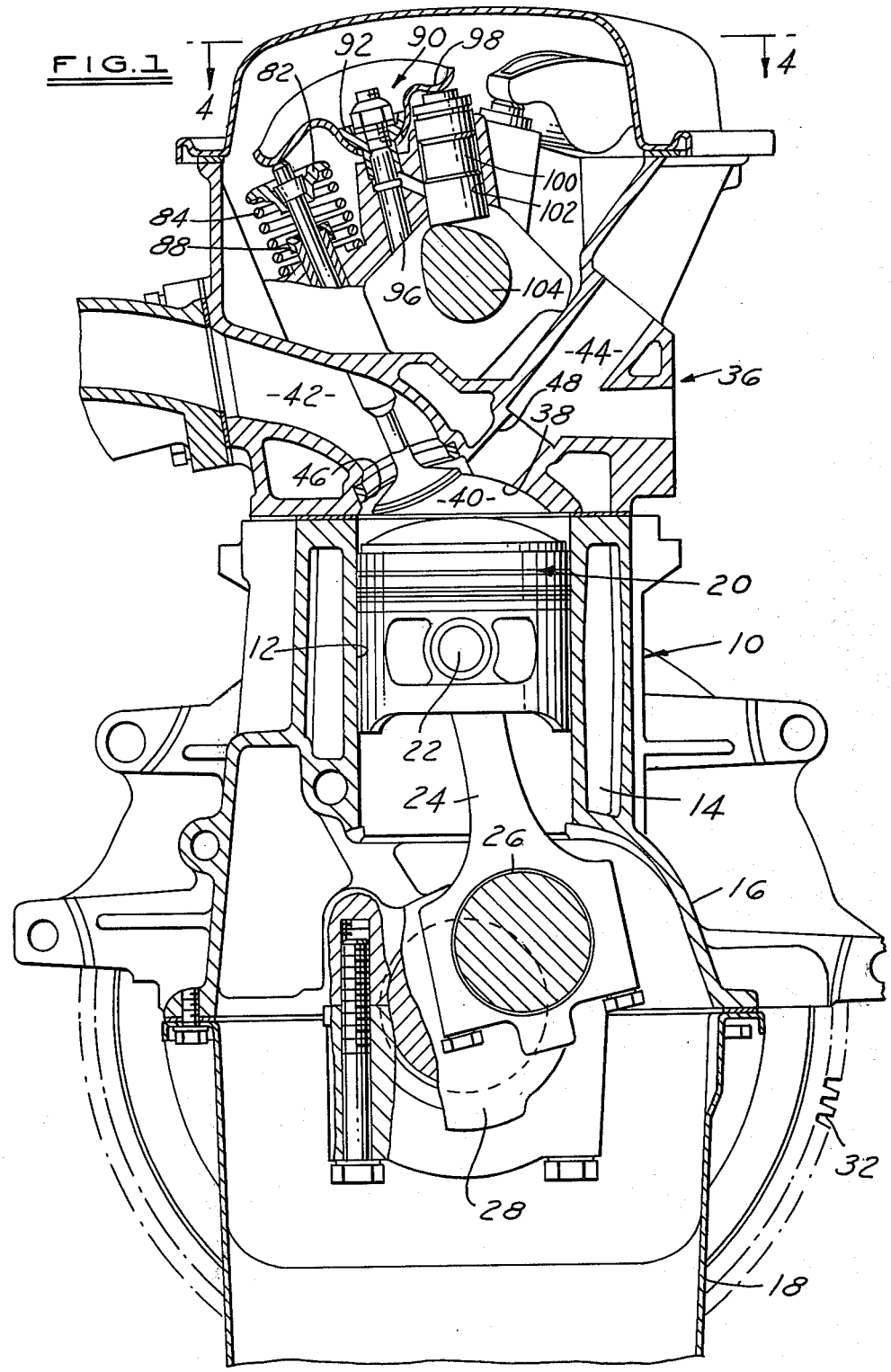
FIG. 1 is a partially schematic end view of a portion of an engine embodying the invention, with parts broken away and in section.

In the drawings, FIG. 1 shows a portion of an engine having a cast iron cylinder block 10 provided with, in this case, four in-line arranged cylinder bores 12 (only one shown). Adjacent the bores are cooling jacket passages 14. Formed integral with the lower portion of the block is a crankcase 16 to which is secured the usual oil pan 18.

Slideably received in each bore for reciprocation therein is an annular piston 20 pivotably connected by a piston pin 22 to the upper end of a connecting rod 24. The lower end of each rod is rotatably connected to the conventional engine crankshaft, not shown, by means of the usual journal bearing 26. The latter eccentrically mounts the connecting rod opposite the usual counterweights 28. Both the connecting rods and the counterweights are connected to the crankshaft by bolts, as shown. The crankshaft in turn is connected to the usual flywheel 32.

The engine includes, in this case, a cast aluminum cylinderhead 36 that is bolted to the engine block. It is formed with a hemispherically shaped recess 38 in its lower face that constitutes the upper surface or dome of a combustion chamber 40. This surface cooperates with the top surface 40 of piston 20, which together with the dome 38 and side walls of the cylinder bore, defines the combustion chamber.

Figure 2:
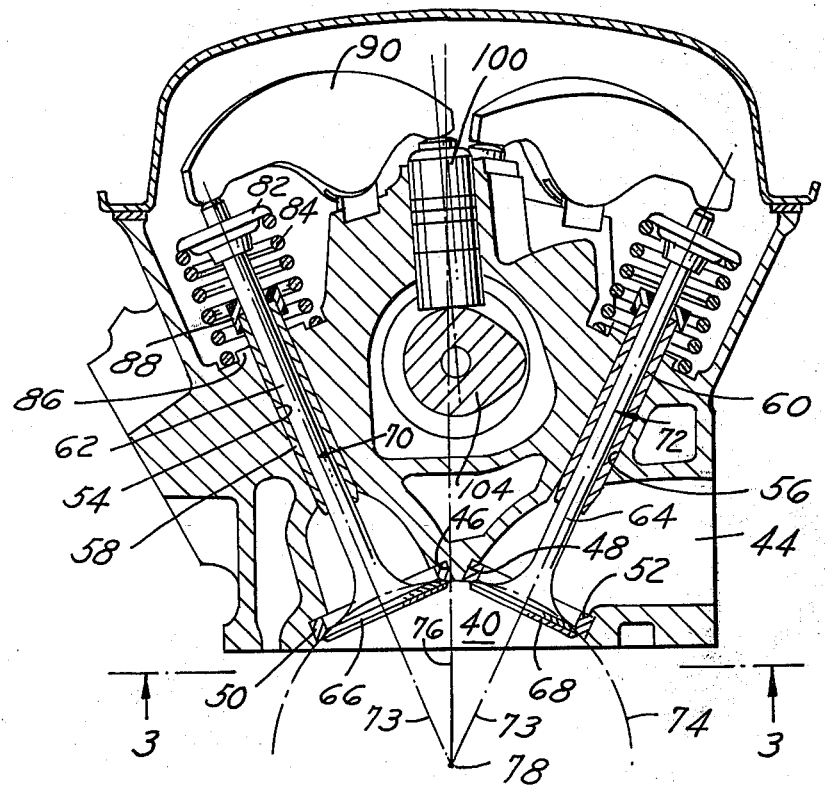
FIG. 2 is an enlarged cross-sectional view of details of FIG. 1.

The head 36 in this case contains the usual intake and exhaust manifold passages 42 and 44, respectively, that terminate at the combustion chamber in valve portions 46 and 48. The valve ports are provided with annular inserts 50 and 52 (FIG. 2) that are flush with surface 38, as shown. As best seen in FIG. 2, that portion of the head 36 overlying each cylinder bore is provided with a set or pair of throughbores 54, 56 within which are inserted valve stem guides 58 and 60. The latter slideably receive the stems 62, 64 of intake and exhaust valves 66 and 68, respectively, which as seen in FIG. 2, are flush mounted in the hemispherical surface 38. With this specific flush mounting, no recesses or pockets are created between the edge of the valve and the port that would cause a buildup of hydrocarbon deposits.

The flush mounting of the valves is made possible by locating the centerlines 70,72 of each valve at right angles or perpendicular to hemispherical surface 38 to constitute radii 73 of an arc 74 drawn from the centerline 76 of the bore 12. Thus, it will be seen that the centerlines 70, 72 of the valves of each set of intake and exhaust valves meet at a common point 78 on the centerline of the cylinder bore.

Each of the valve assemblies contains the usual valve spring retainer 82 against which is seated a valve spring 84. The opposite end seats against a shoulder 86 on the cylinder head. A valve stem seal 88 is included to control oil flow down the stem of each valve in the usual manner.

As best seen in FIG. 1, each valve stem is engaged by and adapted to be actuated by one end of a cast rocker arm 90. The latter is pivotably mounted for movement in a single plane on a fixed semi-cylindrical fulcrum 92. The fulcrum is individually stud mounted to the cylinder head by a bolt or stud 96. The fulcrum 92 in this case is flat sided to mate with the inside walls of rocker arm 90 to prevent lateral rotation of the rocker arm about the axis of the stud.

The opposite end portion 98 of rocker arm 90 is engaged directly by the upper end of a hydraulic tappet 100 that is slidably moveable in a bore 102 provided for this purpose. The lower portion of each tappet is engaged by its own cam 104 (FIG. 4) formed on a separate portion of a single overhead camshaft 106. The camshaft is mounted in suitable bearings as indicated in FIG. 4 and contains a pair of axially adjacent but spaced cams 104, 108 for each set of intake and exhaust valve tappets.

As best seen in FIG. 5, all of the components of each valve train, i.e., tappet 100, rocker arm 90 and the valve stem 62, 64 and valve 66, 68 are mounted for movement in a single plane to eliminate side thrust forces on the valve train. This is accomplished by arranging the component centerlines 110,112 and 72 of the tappet 100, rocker arm stud 96, and valve stem 64 together converge toward the cylinder bore centerline and meet at a common point 114 as shown in FIG. 5. This single plane containment is also indicated in FIG. 6 at 116.

It will be clear that in order for each set of intake and exhaust valves to be flush mounted in the hemispherical surface 38 of the combustion chamber utilizing a single overhead camshaft, the valve train planes 116 must be located as seen in FIG. 6, i.e., obliquely with respect to a vertical plane containing the rotational axis 118 of the camshaft. Otherwise, adjacent tappets 100 would interfere with one another. Since, as stated before, it is necessary for eliminating side thrust forces that the components of each valve train be moveable in a single plane, then it is also necessary to move the centerlines of the intake and exhaust valve ports away from the cylinder bore centerlines, as indicated in FIG. 3. That is, the centerline 120, 122 of each valve ports 46, 48 is located on a line that is not on the lateral or longitudinal axis of the cylinder bore.

Moving the intake and exhaust valve ports in this manner also necessitates angling or canting each valve train plane 116 (FIG. 6) with respect to a vertical plane perpendicular to the camshaft axis 118 and perpendicular to the axis of rotation of the camshaft. This is more clearly seen in FIGS. 4–6 where the valve train plane 124 for the intake valve is not only canted or angled with respect to a plane perpendicular to the camshaft axis, but also canted slightly with respect to the valve train plane 126 of the exhaust valve.

The tappet 100 as seen in FIGS. 1 and 5 is also angled with respect to a vertical axis through the cylinder bore. However, this is a matter of convenience and is determined primarily by the overall length of the rocker arm 90. A longer rocker arm, for example, could locate the tappet 100 in a vertical position or coincidental with the vertical axis of the cylinder bore.

Completing the construction, the centerline of the intake valve 66 is moved rightwardly as seen in FIG. 3 to overlap the edge of the valve and valve port with the centerline 76 of the cylinder bore. This provides a larger intake valve opening and more engine power due to the increased flow area.

From the above, it will be seen that the flush mounting of the valves is accomplished by locating the centerline of each valve perpendicular to the hemispherical surface of the combustion chamber and constituting radii of that surface meeting at a common point 78 on the centerline of the cylinder bore centerline. The intake and exhaust valves are symetrically located on opposite sides of the single overhead camshaft that is centrally located. It will also be seen that in order to maintain the single plane action of the valve train as shown in FIG. 5 and as previously described, i.e., that all of the components of the valve train act in a common plane, that the valve train plane is canted obliquely with respect to the camshaft rotational axis and with respect to a vertical plane perpendicular to that axis so that the tappets 58 can be actuated by the single camshaft. It will further be seen that the centerlines of the components of the valve train together converge towards the cylinder bore axis to meet at a common point.

From the foregoing, it will be seen that the invention provides an engine construction that minimizes the output of unburned hydrocarbons by utilizing a combustion chamber having a hemispherically shaped dome or cover portion in which are flush mounted the intake and exhaust valves to reduce the surface/volume ratio to a minimum to minimize the output of unburned hydrocarbons. It will also be seen that the invention provides valve train components that act in single planes that are canted obliquely with respect to the single camshaft rotational axis and that as a result side thrust forces on the valve train components are eliminated.

While the invention has been shown and described in its preferred embodiment, it will be clear to those skilled in the arts to which it pertains that many changes and modifications may be made thereto without departing from the scope of the invention.

We claim:

1. A low emission output internal combustion engine construction comprising a cylinder block having a plurality of cylinder bores therein, and a cylinder head secured over the block and having adjacent each cylinder bore a hemispherically shaped recess together with the adjacent cylinder bore defining a combustion chamber having a hemispherical surface facing the adjacent cylinder bore, each surface having an inlet valve and an exhaust valve therein, the longitudinal centerlines of the valves each being perpendicular to the hemispherical surface and extending towards the bore to intersect the centerline of the cylinder bore at a common point effecting a seating of the faces of all the valves flush against the hemispherical surface to thereby provide a minimum surface area exposed to combustion chamber hydrocarbon buildup, valve train means for reciprocating the valves comprising a single camshaft centrally mounted on the cylinder head having a plurality of axially spaced cams thereon, a plurality of pivotal rocker arms each stud mounted on the cylinder head and engaged at one end by tappet means engaged with a cam on the camshaft and engaged at the opposite end with the end of a valve, the inlet and exhaust valves being symetrically located on opposite sides of the camshaft, and spring means biasing each valve to a closed position with the valve face flush with the hemispherical surface, the longitudinal centerlines of the tappet, rocker arm stud and valve of each valve train together intersecting at a common point and being contained and movable in a single plane that is both oblique to the rotational axis of the camshaft and canted to lie at an angle between the horizontal axis of rotation of the camshaft and the vertical axis of the cylinder bore, whereby each valve longitudinal centerline then will intersect the hemispherical surface in a perpendicular manner locating the valve flush therewith and with the valve centerline intersecting the surface at a point other than on the longitudinal and transverse centerlines of the surface, each rocker arm includes said stud mounting the rocker arm for independent attitude with respect to the other rocker arms and a semicylindrical fulcrum secured to the stud engageable with the rocker arm preventing rotation of the rocker arm about the longitudinal axis of the stud to maintain movement of the valve train in the single plane, and each port being offset with respect to the longitudinal and transverse centerlines of the cylinder bore, the inlet valve port overlapping the centerline of the cylinder bore.

* * * * *